United States Patent [19]

Baettig et al.

[11] Patent Number: 5,684,140
[45] Date of Patent: Nov. 4, 1997

[54] DYES FOR INK JET PRINTING

[75] Inventors: Kurt Baettig, Praroman; Gerald Jan, Villars-sur-Glane, both of Switzerland

[73] Assignee: Ilford A.G., Switzerland

[21] Appl. No.: 718,354

[22] PCT Filed: Feb. 5, 1996

[86] PCT No.: PCT/GB96/00262

§ 371 Date: Dec. 16, 1996

§ 102(e) Date: Dec. 16, 1996

[87] PCT Pub. No.: WO96/24635

PCT Pub. Date: Aug. 15, 1996

[30] Foreign Application Priority Data

Feb. 7, 1995 [GB] United Kingdom ............... 9502334

[51] Int. Cl.$^6$ ............... C09B 43/16; C09D 11/00
[52] U.S. Cl. ............... 534/803; 534/728; 106/22 K
[58] Field of Search ............... 534/728, 803; 106/22 K

[56] References Cited

U.S. PATENT DOCUMENTS 3,843,623  10/1974  Siegel ............... 534/803
4,661,158  4/1987  Kobayashi et al. ............... 106/22

FOREIGN PATENT DOCUMENTS 3517891     11/1985  European Pat. Off. .
0559331 A1  9/1993   European Pat. Off. .
2386589     11/1978  France .

Primary Examiner—Fiona T. Powers
Attorney, Agent, or Firm—Ostrager, Chong & Flaherty

[57] ABSTRACT

There is described a new magenta azo dye which can be used in an aqueous composition in an ink-jet printing process.

9 Claims, No Drawings

DYES FOR INK JET PRINTING

This is a 371 of PCT/GB96/00262 filed Feb. 5, 1996.

FIELD OF THE INVENTION

The present invention relates to dyes and aqueous ink composition comprising these dyes for ink jet printing processes.

Ink jet printing systems generally are of two types: continuous stream and drop-on-demand. In continuous stream ink jet systems, ink is emitted in a continuous stream under pressure through an orifice or nozzle. The stream is perturbed, causing it to break up into droplets at a fixed distance from the orifice. At the break up point, the droplets are charged in accordance with digital data signals and passed through an electrostatic field which adjusts the trajectory of each droplet in order to direct it to a waste ink collecting vessel (e.g. for recirculation) or a specific location on a recording medium. In drop-on-demand systems, a droplet is expelled from an orifice to a position on a recording medium in accordance with digital data signals. A droplet is not formed or expelled unless it is to be placed on the recording medium.

The most important part of an ink used in ink jet printing are the dyes. Although a number of dyes have been proposed none has been produced which meets all the requirements of a modern printing process.

BACKGROUND OF THE INVENTION

Reactive dyes with incorporated 1,3,5-triazine structural elements are common in textile printing and have also been proposed for ink jet printing. Such dyes are for several reasons in general not too well suited for this application. The reactive groups are not very stable over prolonged periods in aqueous solutions. Dyes containing such reactive groups are moreover, due to their potential health risk, less suitable for handling in a non industrial environment.

Reactive dyes of this kind have been described in EP 559'331 (B. Lamble et al). In particular dyes of the following structural formulas have been described:

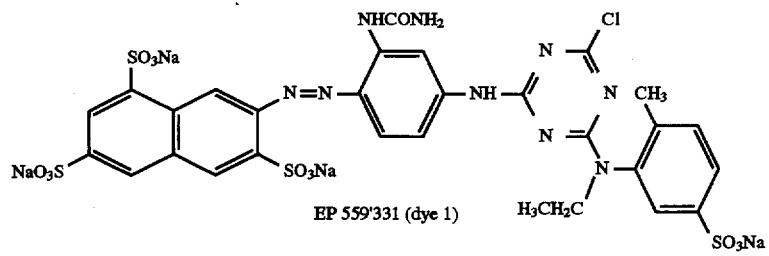

EP 559'331 (dye 1)

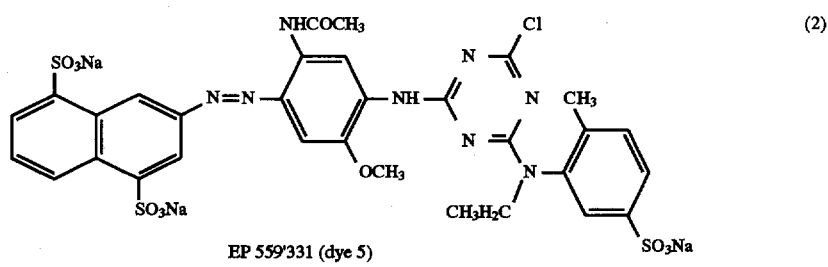

EP 559'331 (dye 5)

These dyes are however still inadequate when used in aqueous inks of modern ink jet printers. In particular printers of the continuous-stream type are highly demanding as far as physical properties of the inks are concerned. Particularly critical is the storage stability of the inks without forming degradation products prone to clog the nozzles of the printer. Printers are today able to print images of high density rapidly. Therefore highly concentrated inks are needed in order to avoid the jetting of high water volumes onto the receiving layer. These high concentrations should ideally, for environmental reasons, be achieved without the use of organic cosolvents. Such inks can only be prepared with dyes having a particularly high water solubility.

Dyes of the above mentioned structures which are the state of the art, are in general not soluble or stable enough to satisfy the required demanding conditions. It is the aim of this invention to provide dyes with the required high water solubility.

DESCRIPTION OF THE INVENTION

This invention relates to azo dyes of the formula (3)

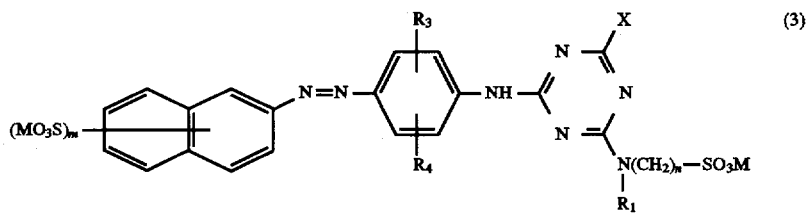

wherein:

$R_1$ is selected from hydrogen or an aliphatic radical having from 1 to 6 C atoms;

n is 2, 3 or 4;

$R_3$, $R_4$ are independently selected from hydrogen, alkyl or alkoxy or acylamino containing up to 3 C atoms;

X is $NR_5R_6$ where $R_5$ and $R_6$ are independently selected from hydrogen, alkyl from 1 to 6 C atoms, substituted alkyl having 2 to 6 C atoms where the substituents are selected from OH, $OCH_3$, COOM, $SO_3M$; aralkyl; unsubstituted aryl or an awl substituted by COOM or $SO_3M$; $R_5$ and $R_6$ may form a ring without or with inclusion of a hetero atom;

or

X is $SR_7$ in which $R_7$ is an unsubstituted alkyl from 1 to 6 C atoms; substituted alkyl having 2 to 6 C atoms where the substituents are selected from OH, $OCH_3$, COOM, $SO_3M$;

or

X is $OR_8$ in which $R_8$ is hydrogen or an aliphatic radical having from 1 to 6 C atoms;

m is 1, 2 or 3 and the substitution pattern is selected from 4,8/5,7/6,8/3,6,8 or 4,6,8. In a case where m is 1, $SO_3M$ may also be in position 1 or 4 to 8;

M is hydrogen, a metal atom, an ammonium or ammonium substituted with alkyl, alkoxyalkyl and hydroxyalkyl each having 1 to 12 C atoms.

The azo dyes of the present invention comprise no reactive groups. They are of particular use in inks used for ink-jet printing because of their high water solubility.

Dye Synthesis

One method of preparing dyes of the present invention is by:

(i) Reacting a compound of formula (4)

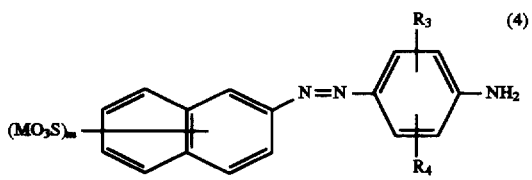
(4)

with cyanuric chloride under conditions such that one chlorine atom of the triazine is displaced by the monoazo compound of formula (4), then (ii) reacting the mono-substituted dichloro-triazine with a compound of formula (5)

(5)

under condition such that a second atom of chlorine is displaced by the compound of formula (5) and reacting finally (iii) the di-substituted triazine with a compound XH under conditions that the third chlorine atom is displaced by X.

Where X is a compound of formula 5, the second and third chlorine atoms of the triazine nucleus may be displaced simultaneously.

The present invention is illustrated by the following example:

EXAMPLE 1

Preparation of the compound No. 100 (Na-salt)

Stage 1

62.2 g (0.126 mol) monoazo compound of Formula (6)

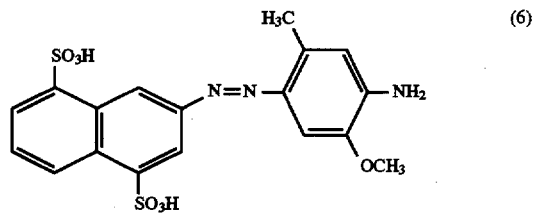
(6)

(prepared as described in U.S. Pat. No. 3,264,109) was added to water (200 ml) and the pH adjusted to 9.5 by addition of 30 % sodium hydroxide solution.

A solution of cyanuric chloride (25.4 g, 0.138 mol) in ethyl acetate (90 ml) was added maintaining the pH at 8.2–8.5 and the temperature at 20°–25° C. After 30 minutes a solution of 2-aminoethanesulfonic acid (20.4 g, 0.138 mol) in water (30 ml) and 30% sodium hydroxide solution (22 g) was added to the reaction mixture while maintaining the pH at 9–9.5 and the temperature at 30° C. The reaction mixture was stirred for 6 hours at this temperature and pH and then the product was filtered.

Stage 2

The wet product (200 g) from stage 1 was added to a mixture of water (300 ml) and 30% sodium hydroxide solution (36 g). The reaction mixture was heated to 90° C. for 6 hours and cooled to room temperature. Acetic acid (8.5 ml) was added to obtain a pH value of 7.5 followed by an addition of methanol (340 ml). The solid was collected by filtration, washed with methanol (150 ml), dried in vacuum at 60° C. to yield the yellow dye (85 g) of formula 100.

In an analogous manner using appropriate starting materials the dyes described in Tables 1 to 3 can be obtained.

TABLE 1

The dyes of the general formula:

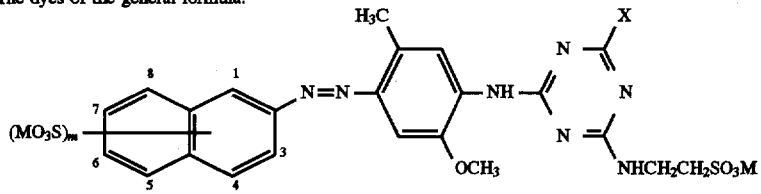

were made wherein the substituents are:

| Compound No. | SO₃M positions | X | M | $\lambda_{max}$ (nm) in H₂O |
|---|---|---|---|---|
| 100 | 4, 8 | OH | Na | 398 |
| 101 | 4, 8 | SCH₂CH₂OH | Na | 404 |
| 102 | 4, 8 | SCH₂COONa | Na | 408 |
| 103 | 4, 8 | N(CH₂CH₂OH)₂ | Na | 409 |
| 104 | 4, 8 | NHCH₂CH₂SO₃K | K | 405 |
| 105 | 4, 8 | OCH₂CH₃ | Na | 406 |
| 106 | 5, 7 | OH | Na | 393 |

TABLE 2

The dyes of the general formula:

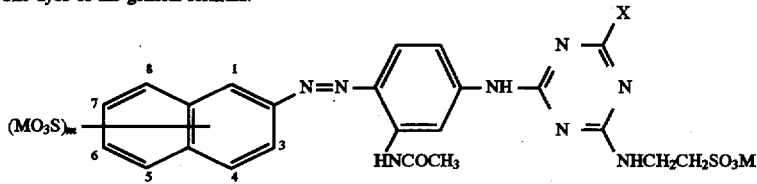

were made wherein the substituents are:

| Compound No. | SO₃M positions | X | M | $\lambda_{max}$ (nm) in H₂O |
|---|---|---|---|---|
| 201 | 4, 8 | OH | Na | 394 |
| 202 | 4, 8 | SCH₂CH₂OH | Na | 394 |
| 203 | 4, 8 | SCH₂COONa | Na | 398 |

TABLE 3

The dyes of the general formula:

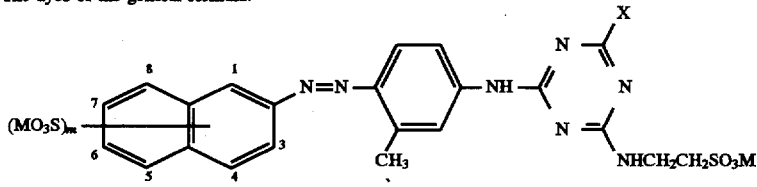

were made wherein the substituents are:

| Compound No. | SO₃M positions | X | M | $\lambda_{max}$ (nm) in H₂O |
|---|---|---|---|---|
| 301 | 4, 8 | OH | Na | 378 |

EXAMPLE 2

The dyes of the present invention are specially adapted for the preparation of inks. Inks for ink jet printing are well known. These inks consist in essence of a liquid vehicle and dissolved therein a dye. The liquid vehicle of the inks employed for the printing consists in general of water or a mixture of water and a miscible organic solvent such as C1–C4 alkanols, alkylene glycols such as di(propylene glycol), di(ethylene glycol), polyols such as 1,5-pentanediol, gycerol, 1,2,6-trihydroxyhexane, nitrogen-containing solvents such as 2-pyrrolidinone, N-methyl-2-pyrrolidinone, 1-(2-hydroxyethyl)-2-pyrrolidinone, 1,3-dimethyl-2-imidazolidinone, 1,1,3,3-tetramethylurea or sulfur containing solvents such as organosulfoxides, sulfolane and the like.

The non water parts of the printing ink generally serve as humefactant, cosolvent, viscosity regulating agent, ink penetration additive, levelling agent or drying agent.

In addition aqueous inks may contain miscellaneous known additives like viscosity modifiers, such as cellulose derivatives and other water-soluble resins, various kinds of surfactants, surface tension modifiers, optical brighteners, UV absorbers, light stabilisers, biocides and pH conditioners, such as buffers.

Inks for use in ink jet recording of the type based on continuous-stream usually contain an inorganic salt as electrolyte, such as sodium/ammonium/lithium halogenides or sulphate.

This description of inks is for illustration only and is not to be considered as limiting the invention.

The present invention in so far as it relates to inks is further illustrated with reference to the following examples in which all parts and percentages are by weight.

Inks were prepared, using the dyes 100 to 102, as described above, according to the following recipe:

|  |  |
|---|---|
| dye | 6 parts |
| glycerol | 20 parts |
| water | 74 parts |

The inks were prepared by dissolving the ingredients and filtering the solution under pressure through a Millipore filter (0.5 micron).

The inks were tested and shown to satisfy all the requirements specifying a usable ink. In particular they were shown to meet the following criteria:

(1) Physical properties of the ink, such as viscosity, conductivity and surface tension, are each within a defined range.
(2) All dyes have good solubility in the ink medium to give solutions having good stability which do not plug the fine ejecting orifices.
(3) The recording agent gives images of sufficient optical density.
(4) The ink does not change physical properties or deposit solid matter during storage.
(5) Printing can be performed without a restriction on the nature of substrate.
(6) The ink exhibits a high rate of fixation.
(7) The ink gives images of good resistance to water, light and abrasion.

EXAMPLE 3

The solubilities of the dyes according to the invention were determined as follows:

An excess of dye was heated at 50° C. in water with stirring for one hour. The mixture was then cooled down to 20° C. and filtered, and the dye content of the clear solution was determined spectroscopically. The results obtained are shown in table 4.

TABLE 4

| dye No | solubility (in g per 100 ml) |
|---|---|
| 100 | 31 |
| 101 | 40 |
| 102 | 54 |
| dye 1 | 11 |
| dye 5 | 17 |

The dyes 1 and 5 are known from EP 559'331 as heretofore set forth.

The results in table 4 show the significantly higher solubility of the dyes according to the invention compared to dyes of the prior art.

We claim:
1. An azo dye of formula (3)

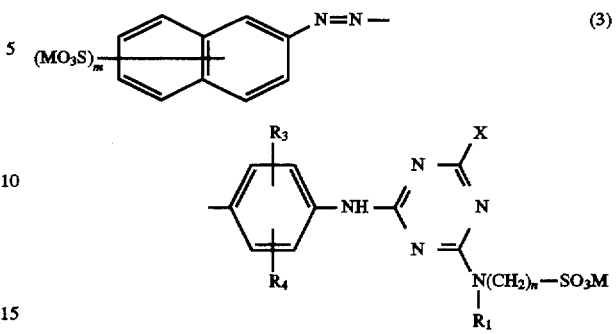

wherein $R_1$ is selected from hydrogen or an aliphatic radical having from 1 to 6 C atoms;

n is 2, 3 or 4;

$R_3$, $R_4$ are independently selected from hydrogen, alkyl or alkoxy or acylamino containing up to 3 C atoms;

X is $NR_5R_6$ where $R_5$ and $R_6$ are independently selected from hydrogen, alkyl from 1 to 6 C atoms, C2 to C6 substituted alkyl where the substituents are selected from OH, $OCH_3$, COOM, $SO_3M$ or an aryl substituted by COOM, $SO_3M$ or $R_5$, $R_6$ form a ring without or with inclusion of a hetero atom;

or

X is $SR_7$ in which $R_7$ is an unsubstituted alkyl from 1 to 6 C atoms, alkyl having 2 to 6 C atoms substituted by OH, $OCH_3$, COOM, $SO_3M$;

or

X is $OR_8$ in which $R_8$ is hydrogen or an aliphatic radical having from 1 to 6 C atoms;

m is 1, 2 or 3 and the substitution pattern is selected from 4,8/5,7/6,8/3,6,8 or 4,6,8. In a case where m is 1, —$SO_3M$ may also be in position 1 or 4 to 8;

M is hydrogen, a metal atom, an ammonium or ammonium substituted with alkyl, alkoxyalkyl and hydroxyalkyl each having 1 to 12 C atoms.

2. An azo dye according to claim 1 where $R_1$ is hydrogen and where

X, $R_3$ to $R_8$, n, m, M and the substitution pattern in the naphthaline ring are as set forth in claim 1.

3. An azo dye according to claim 2 where n is 2 or 3

$R_3$, $R_4$ are independently selected from hydrogen, alkyl or alkoxy or acylamino containing up to 3 C atoms;

$R_5$, $R_6$ are independently selected from hydrogen, C1 to C6 alkyl, C2 to C6 substituted alkyl where the substituents are selected from OH, $CH_3$, COOM, $SO_3M$ or $R_5$, $R_6$ form a 5- or 6-membered ring without or with inclusion of a hetero atom;

or

X is $SR_7$ where $R_7$ is a C2 to C4 substituted alkyl where the substituents are selected from OH, $OCH_3$, COOM, $SO_3M$;

X is $OR_8$ where $R_8$ is hydrogen, $CH_3$ or $CH_2CH_3$;

M is as in claim 2;

and m is 2 and the substitution pattern in the naphthaline part is 4,8 or 6,8 or 5,7.

4. An azo dye according to claim 3 where $R_3$, $R_4$ are independently selected from hydrogen, $OCH_3$, $OCH_2CH_3$, $CH_3$, $CH_2CH_3$ or $HNCOCH_3$;

X is $NR_5R_6$ where $R_5$ and $R_6$ are as set forth in claim 3;

or

X is S—$(CH_2)_q$—OH, S—$(CH_2)_q$—COOM or S—$(CH_2)_q$—$SO_3M$ where
q is 1 to 6;

or

X is $OR_8$ where $R_8$ is as set forth in claim 3;

M is hydrogen, alkali metal atom, ammonium, ammonium substituted with C1 to C2 alkyl or with $CH_2CH_2OH$;

m is 2 and the substitution pattern in the naphthaline part of the dye is 4,8 or 6,8 or 5,7.

5. An azo dye according to the formula 7

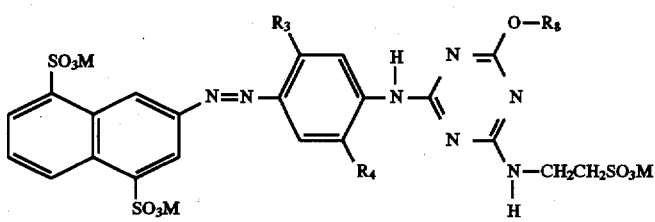

(7)

where
$R_3$, $R_4$ are independently selected from hydrogen, $CH_3$, $OCH_3$ or $NHCOCH_3$;

$R_8$ is hydrogen, $CH_3$ or $CH_2CH_3$;

and
M is as set forth in claim 4.

6. An azo dye according to formula 8

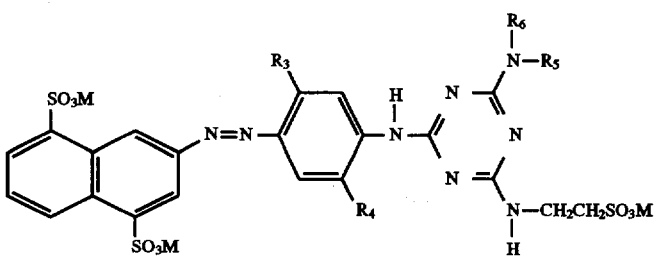

(8)

where
$R_3$, $R_4$ are as set forth in claim 5;
$R_5$, $R_6$ are independently selected from hydrogen, $CH_3$, $CH_2CH_2OH$ or $CH_2CH_2SO_3M$;

and

M is hydrogen, alkali metal atom, ammonium, ammonium substituted with C1 to C2 alkyl or with $CH_2CH_2OH$.

7. An azo dye according to formula 9

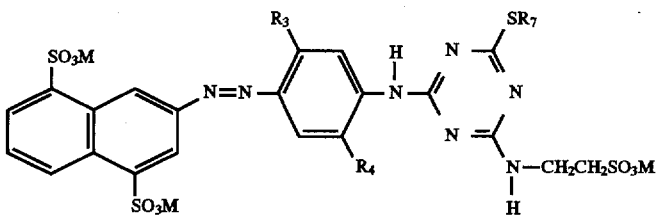

(9)

where
$R_3$, $R_4$ are as set forth in claim 5
$R_7$ is selected from $CH_2CH_2OH$, $CH_2COOM$ or $CH_2CH_2CH_2SO_3M$;

and

M is hydrogen, alkali metal atom, ammonium, ammonium substituted with C1 to C2 alkyl or with $CH_2CH_2OH$.

8. An ink comprising at least one dye as described in anyone of claims 1 to 7.

9. An ink which contains in addition to a dye or dyes as claimed in anyone of claims 1 to 7 one or more other dyes or additives.

* * * * *